United States Patent
Danielsen

(10) Patent No.: US 7,508,950 B2
(45) Date of Patent: *Mar. 24, 2009

(54) METHOD OF CURRENT MANAGEMENT IN A BATTERY POWERED DEVICE AND BATTERY POWERED DEVICE

(75) Inventor: Finn Danielsen, Hellerup (DK)

(73) Assignee: Oticon A/S, Smørum (DK)

( * ) Notice: Subject to any disclaimer, the term of this patent is extended or adjusted under 35 U.S.C. 154(b) by 605 days.

This patent is subject to a terminal disclaimer.

(21) Appl. No.: 10/530,655

(22) PCT Filed: Sep. 29, 2003

(86) PCT No.: PCT/DK03/00636

§ 371 (c)(1),
(2), (4) Date: Jun. 8, 2005

(87) PCT Pub. No.: WO2004/034073

PCT Pub. Date: Apr. 22, 2004

(65) Prior Publication Data

US 2006/0050910 A1    Mar. 9, 2006

(30) Foreign Application Priority Data

Oct. 8, 2002    (DK)    ............... 2002 01511

(51) Int. Cl.
*H04R 25/00* (2006.01)

(52) U.S. Cl. ...................... 381/323; 381/312

(58) Field of Classification Search ............ 381/60, 381/106, 312, 314, 320, 321, 323; 600/25; 607/55, 57

See application file for complete search history.

(56) References Cited

U.S. PATENT DOCUMENTS

| | | | |
|---|---|---|---|
| 5,024,224 A * | 6/1991 | Engebretson | 607/57 |
| 5,619,126 A | 4/1997 | Lang | |
| 6,188,142 B1 | 2/2001 | Loth-Krausser | |
| 7,120,500 B1 * | 10/2006 | Seligman | 607/55 |

FOREIGN PATENT DOCUMENTS

| | | |
|---|---|---|
| WO | 0178449 | 10/2001 |
| WO | 0207480 | 1/2002 |

* cited by examiner

*Primary Examiner*—Brian Ensey
(74) *Attorney, Agent, or Firm*—Dykema Gossett pLLC

(57) ABSTRACT

A method of current management in a battery powered device includes the steps of (a) comparing the actual supply voltage from the battery with a fixed reference voltage, (b) generating a control signal whenever the supply voltage is below the reference voltage, (c) using the control signal to reduce the load current in the battery powered device, whereby the supply voltage from the battery will increase, and (d) repeating steps a, b and c as long as the supply voltage is below the reference voltage. A current management system is provided that, when used within a hearing aid, will allow very high load currents and thereby high sound pressure levels to be obtained from the hearing aid. This is achieved without having severe problems with the reduced battery voltage when the battery approaches the end of its lifetime and/or if the air flow within the battery becomes insufficient.

7 Claims, 1 Drawing Sheet

METHOD OF CURRENT MANAGEMENT IN A BATTERY POWERED DEVICE AND BATTERY POWERED DEVICE

AREA OF THE INVENTION

The invention relates to the area of battery powered devices and more particularly the invention relates to the management of the power consumption of such devices. Such devices include hearing aids and similar small size battery powered electronic devices.

BACKGROUND OF THE INVENTION

One of the characteristics of the batteries used in a hearing aid is the relatively high internal impedance for this type of voltage source. Furthermore during the lifetime of the battery this impedance increases. As an example the internal impedance for a fresh battery may start at 1-2 Ohm (at 100 Hz) and increase to perhaps 10 Ohm at the end of the lifetime. Another and even worse problem is related to the most common battery type for hearing aids, namely the zinc-air battery. As the name implies one of the active ingredients for operation is air. The amount of air needed is dependent on the current supplied from the battery and if a certain current limit is exceeded the airflow through the inlets of the battery becomes insufficient. As a result the battery voltage starts to drop. To make it worse this current limit is not the same for different battery manufacturers and is also a function of time.

For some hearing aids the above weaknesses is a major problem. If the maximum current consumption from the hearing aid is being limited to a conservative magnitude in order to avoid problems with the battery voltage drop, the maximum sound pressure, which the hearing aid can supply will be clearly below the needs for some of the hearing impaired. Increasing the maximum current on the other hand will especially for modern hearing aids with an EEPROM memory give another problem. For these hearing aids applies that if the battery voltage is below a certain limit, the settings of the hearing aid can not be guaranteed and a reset of the digital control circuit must be carried out—during which the hearing aid is inoperative. In other words some type of control within the hearing aid is needed, which will allow the hearing aid to profit from the high current, which the best zinc-air batteries can deliver, but on the other hand restricts the current demand from the hearing aid if the battery voltage starts to drop.

The objective is to provide a power consumption management method and a power consumption system that remedies these drawbacks of existing battery powered systems.

SUMMARY OF THE INVENTION

According to the invention the objective of the invention is achieved by means of the method.

By reducing the load current and at the same time monitoring the supply voltage, the output voltage from the battery will never go far below a chosen reference voltage. By using the feedback within the system the amount of load current reduction avid never be more than what is precisely needed.

In a preferred embodiment the device is an amplifier in a hearing aid, and the repetition frequency of monitoring—and load current deduction steps is higher than twice the highest audio frequency of the hearing aid. With the help of such a fast feedback—and monitoring system the current regulation can happen very quickly, and thereby any harmful side effects on the audio quality will remain small.

By setting the reference voltage above the critical supply voltage of the hearing aid, it is avoided, that the hearing aid resets before the end of the battery lifetime, which otherwise might happen, when the amplifier draws high currents from the battery.

In a preferred embodiment the battery is a zinc-air battery. A battery of this kind requires a supply of air and during periods of high current drain from the battery the air supply can become the limiting factor. This can cause voltage drops below the critical supply voltage and this is avoided with the invention.

Also in connection with the use of rechargeable batteries, the invention can be used. Rechargeable batteries may experience a drop in supply voltage, when large currents are drawn from the battery, and in this case the use of the invention in connection with a hearing aid will ensure, that no reset takes place.

DESCRIPTION OF A PREFERRED EMBODIMENT

Figure 1:
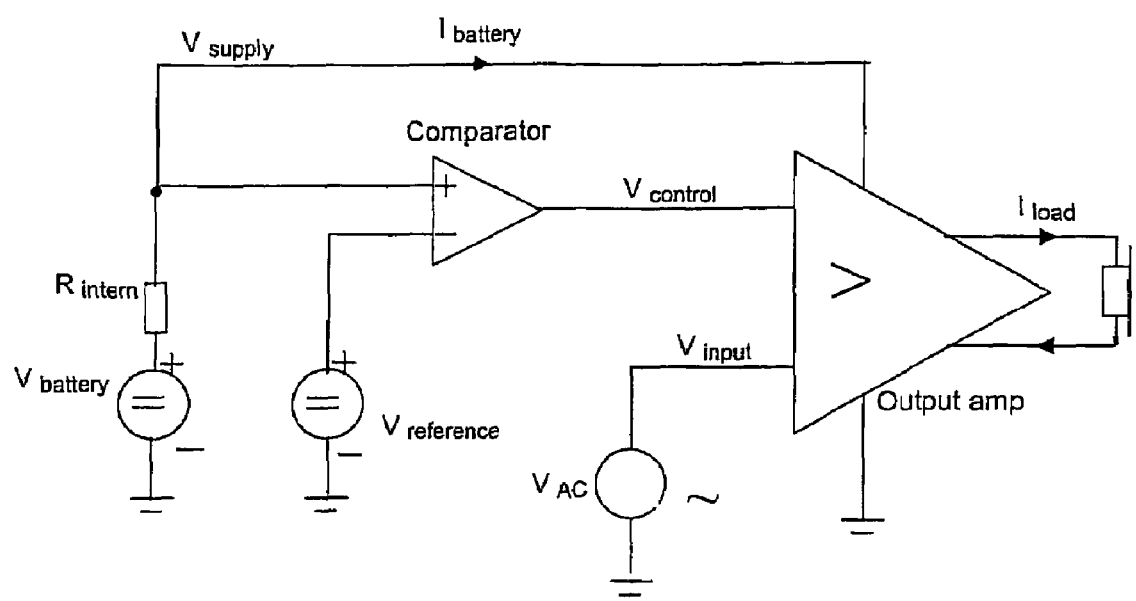
FIG. 1 schematically shows the principles of the invention.

An example of a way to implement the invention is described in the following with reference to FIG. 1.

The load current $I_{load}$ in the receiver is transformed to a current $I_{battery}$ taken from the battery. This current will generate a voltage loss due to the internal resistance $R_{intern}$ and/or due to lack of air within the battery. If the supply voltage $V_{supply}$ goes below a reference voltage $V_{reference}$, the comparator will now change its output state thereby generating a control signal $V_{control}$. This control signal $V_{control}$ is used to reduce the load current $I_{load}$ from the output amplifier—ex. by temporarily disconnecting the load or receiver—then current taken from the battery $I_{battery}$ will decrease and $V_{supply}$ will go up above $V_{reference}$. This in turn will change the output of the comparator and return the output amplifier to normal operation.

This sequence will be repeated as many times as necessary in order to prevent $V_{supply}$ to go far below $V_{reference}$. The net result will be that the average current in the receiver (and thereby the battery current) will be restricted to a value, which the battery can supply and at the same time the supply voltage will stay above or only slightly below the reference voltage. If this reference voltage is chosen to be above the critical supply voltage for proper operation of the digital control circuit of the hearing aid then a reset will not be necessary and the hearing aid will be able to operate almost normally with the only exception that the maximum output level will be reduced compared to an ideal voltage source when the battery voltage drops. Due to the feedback in the system, the amount of reduction of the load current will never be more than what is precisely needed in order to keep the voltage supply at the reference voltage, and consequently the reduction in maximum output level will also be no more than what is needed to avoid that the hearing aid resets.

Due to the repetition of the sequence, this system can be considered to be a sampled system. By the use of a fast comparator the repetition frequency can be very much higher than twice the highest audio frequency of interest and thereby any harmful side effects on the audio quality will remain small.

The invention thus provides a current management system that—when used within a hearing aid—will allow very high load currents and thereby high sound pressure levels to be obtained from the hearing aid. This is achieved without having severe problems with the reduced battery voltage when the battery approaches the end of its lifetime and/or if the air flow within the battery becomes insufficient.

An advantageous side effect of this system will be an extension of the effective lifetime of the battery, as the hearing aid is now able to operate down to very low load currents without any audible side effects other than a somewhat reduced maximum output. This of course compared to a corresponding hearing aid without such a system.

The invention claimed is:

1. A method of current management in a battery powered amplifier in a hearing aid device having a receiver which supplies a sound pressure level, the method comprising the following steps:
   (a) comparing an actual supply voltage from the battery with a fixed reference voltage,
   (b) generating a control signal whenever the supply voltage is below the reference voltage,
   (c) using the control signal to reduce the load current in the battery powered device by temporarily disconnecting the receiver, whereby the supply voltage from the battery will increase, and
   (d) repeating steps a, b and c as long as the supply voltage is below the reference voltage whereby the repetition frequency of steps a, b and c is higher than the highest audio frequency of the hearing aid.

2. The method as claimed in claim 1, wherein the reference voltage is above a critical supply voltage of the hearing aid.

3. The method as claimed in claim 1, wherein the battery is a zinc-air battery.

4. The method as claimed in claim 1, wherein the battery is a rechargeable battery.

5. A battery powered amplifier in a hearing aid device with a battery providing a supply voltage to the device and having a receiver which supplies a sound pressure level, and including means for generating a fixed reference voltage and means for comparing the supply voltage with the reference voltage, and where the comparing means are arranged to deliver a control signal to the device whenever the supply voltage is below the reference voltage, and where the device has means for reducing its current load at the receipt of the control signal by temporarily disconnecting the receiver and whereby the comparing means are arranged to conduct the comparing at a repetition frequency which is above a highest audio frequency of the hearing aid.

6. The battery powered device as claimed in claim 5, wherein the battery is a zinc-air battery.

7. The battery powered device as claimed in claim 5, wherein the battery is a rechargeable battery.

* * * * *